United States Patent
Li et al.

(10) Patent No.: US 11,931,960 B2
(45) Date of Patent: Mar. 19, 2024

(54) 3D PRINTER ASSEMBLY AND ILLUMINATION MODULE THEREOF

(71) Applicant: PHROZEN TECH CO., LTD., Hsinchu (TW)

(72) Inventors: Chang Hsien Li, Hsinchu (TW); Yi Jen Wu, Hsinchu (TW)

(73) Assignee: PHROZEN TECH CO., LTD., Hsinchu (TW)

( * ) Notice: Subject to any disclaimer, the term of this patent is extended or adjusted under 35 U.S.C. 154(b) by 158 days.

(21) Appl. No.: 17/562,563

(22) Filed: Dec. 27, 2021

(65) Prior Publication Data

US 2023/0191700 A1   Jun. 22, 2023

(30) Foreign Application Priority Data

Dec. 17, 2021   (TW) .................................. 110147387

(51) Int. Cl.
| | |
|---|---|
| *B29C 64/286* | (2017.01) |
| *B33Y 30/00* | (2015.01) |
| *F21V 5/04* | (2006.01) |
| *F21V 7/04* | (2006.01) |
| *F21V 13/04* | (2006.01) |

(52) U.S. Cl.
CPC ............ *B29C 64/286* (2017.08); *B33Y 30/00* (2014.12); *F21V 5/04* (2013.01); *F21V 7/04* (2013.01); *F21V 13/04* (2013.01)

(58) Field of Classification Search
CPC ....... B29C 64/00; B29C 64/286; B33Y 30/00; F21V 13/04; F21V 5/04; F21V 7/04; G02B 19/0028; G02B 3/02; G02B 3/04
See application file for complete search history.

(56) References Cited

U.S. PATENT DOCUMENTS

| | | | |
|---|---|---|---|
| 2009/0073531 A1* | 3/2009 | Imai | G02B 26/124 359/205.1 |
| 2019/0018241 A1* | 1/2019 | Haruyama | G02B 27/0149 |
| 2019/0219821 A1* | 7/2019 | Sugiyama | G02B 27/285 |
| 2020/0285119 A1 | 9/2020 | Deaville et al. | |

FOREIGN PATENT DOCUMENTS

| | | |
|---|---|---|
| CN | 103895231 A | 7/2014 |
| CN | 107746865 A | 3/2018 |
| CN | 209014752 U | 6/2019 |
| CN | 213972604 U | 8/2021 |
| TW | M626901 U | 5/2022 |

OTHER PUBLICATIONS

Taiwan Office Action issued in corresponding application No. 110147387, dated Dec. 19, 2022.

* cited by examiner

*Primary Examiner* — Philip C Tucker
*Assistant Examiner* — Jimmy R Smith, Jr.
(74) *Attorney, Agent, or Firm* — Maschoff Brennan

(57) ABSTRACT

An illumination module includes a light emitting unit, an optical lens with positive refractive power, and a concave mirror. At least one of an object-side surface and an image-side surface of the optical lens is an asymmetrical surface, and the light emitting unit is provided at an object side of the optical lens. The concave mirror is provided at an image side of the optical lens, and the concave mirror acts as an optical path folding element. Light emitted by the light emitting unit passes through the optical lens and is reflected by the concave mirror to be a parallel light ray.

10 Claims, 5 Drawing Sheets

3D PRINTER ASSEMBLY AND ILLUMINATION MODULE THEREOF

CROSS-REFERENCE TO RELATED APPLICATIONS

This application claims priority under 35 U.S.C. § 119(a) on Patent Application No(s). 110147387 filed in Taiwan, R.O.C. on Dec. 17, 2021, the entire contents of which are hereby incorporated by reference.

BACKGROUND

1. Technical Field

This present disclosure relates to an illumination module, more particularly an illumination module for 3D printer.

2. Related Art

Recently, 3D printing application has been developed. In addition to general entry-level consumer application, 3D printing technology has been incorporated into some industrial applications such as sample development, mass production, and custom production, resulting in broad applications in medical, transportation, architectural, institutional design, jewelry, dental, and other industries. Also, as the 3D printing application becomes more general, in addition to large-scaled 3D printer used in laboratories or factories, small-scaled 3D printer for offices or personal studios have also been developed in recent years.

In a 3D printing process, the uniform distribution of photosensitive material can affect the quality of light curing, such that it is an important issue that the photosensitive material should be cured by parallel light rays. Currently, the commonly used solution is to position one or more optical lenses at a light path between a light source and the photosensitive material in order to correct the cone-shaped light beam generated by the light source into a parallel light beam. However, as to the large-scaled 3D printer, even if the optical lens can correct the angle of incidence of the light, it is still difficult to correct light rays at off-axis region into parallel light rays. In addition, as to the small-scaled 3D printer, the limited internal space is difficult to accommodate sufficient quantity of optical lens or keep appropriate distance between the optical lens and the light source, and thus result in poor quality of parallel light.

SUMMARY

In view of the above problems, the present disclosure provides an illumination module for 3D printer, and the illumination module helps to solve the problem that an optical lens in a conventional 3D printer cannot generate parallel light rays with high quality.

According to one aspect of the present disclosure, an illumination module includes a light emitting unit, an optical lens with positive refractive power, and a concave mirror. At least one of an object-side surface and an image-side surface of the optical lens is an asymmetrical surface, and the light emitting unit is provided at an object side of the optical lens. The concave mirror is provided at an image side of the optical lens, and the concave mirror acts as an optical path folding element. Light emitted by the light emitting unit passes through the optical lens and is reflected by the concave mirror to be a parallel light ray.

An assembly for 3D printer includes the aforementioned illumination module, a monochrome LCD photomask provided to correspond with the concave mirror of the illumination module, and a photosensitive material container provided adjacent to the monochrome LCD photomask. A mirror surface of the concave mirror faces toward the monochrome LCD photomask. The monochrome LCD photomask is provided between the concave mirror and the photosensitive material container.

According to the present disclosure, the concave mirror which acts as an optical path folding element facilitates the miniaturization of 3D printer. As to the light beam passing through the optical lens, the secondary correction provided by the concave mirror can cause the off-axial light rays to be parallel light rays, which is helpful to improve the quality of parallel light.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
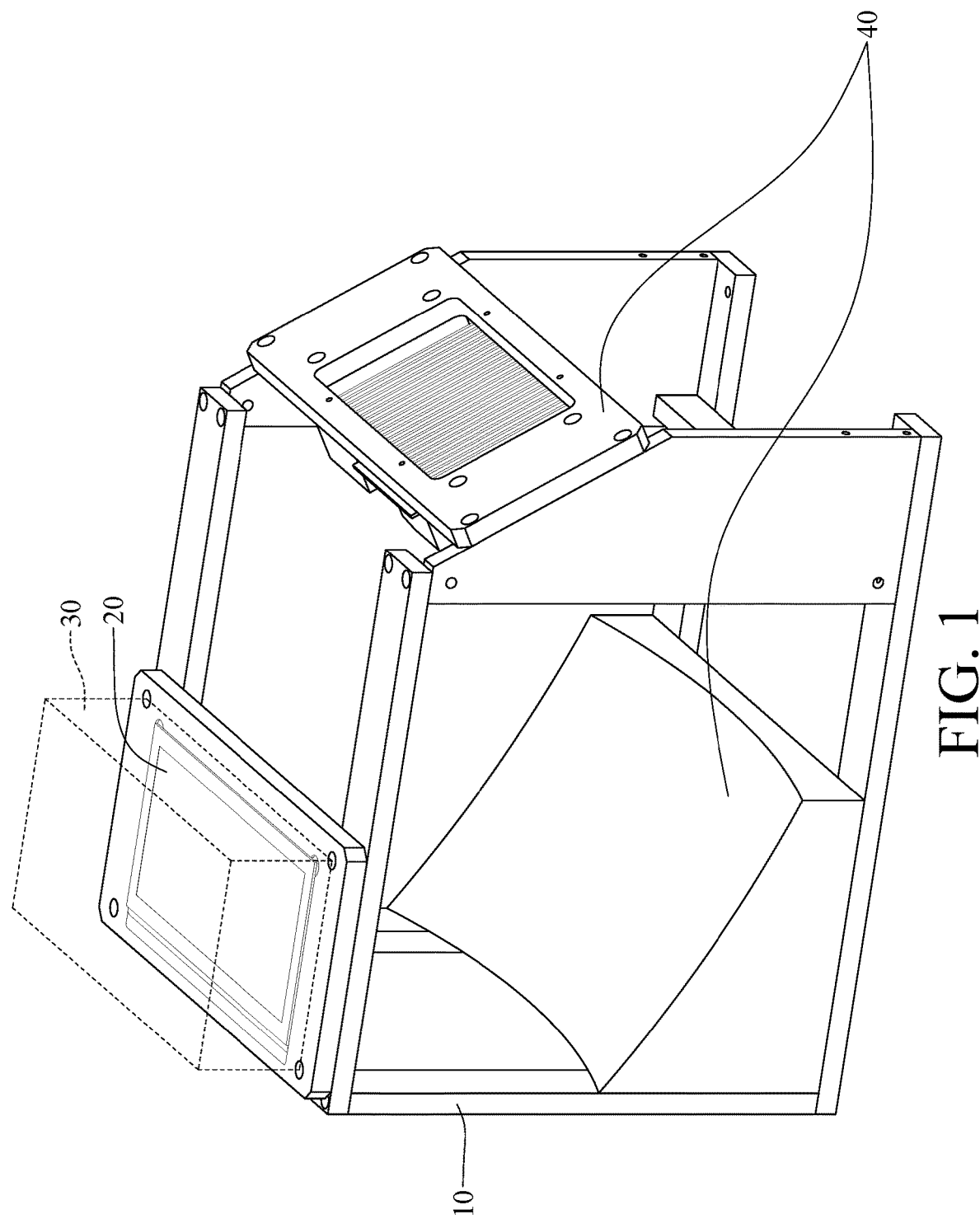
FIG. 1 is a perspective view of an assembly for 3D printer according to one embodiment of the present disclosure.
Figure 2:
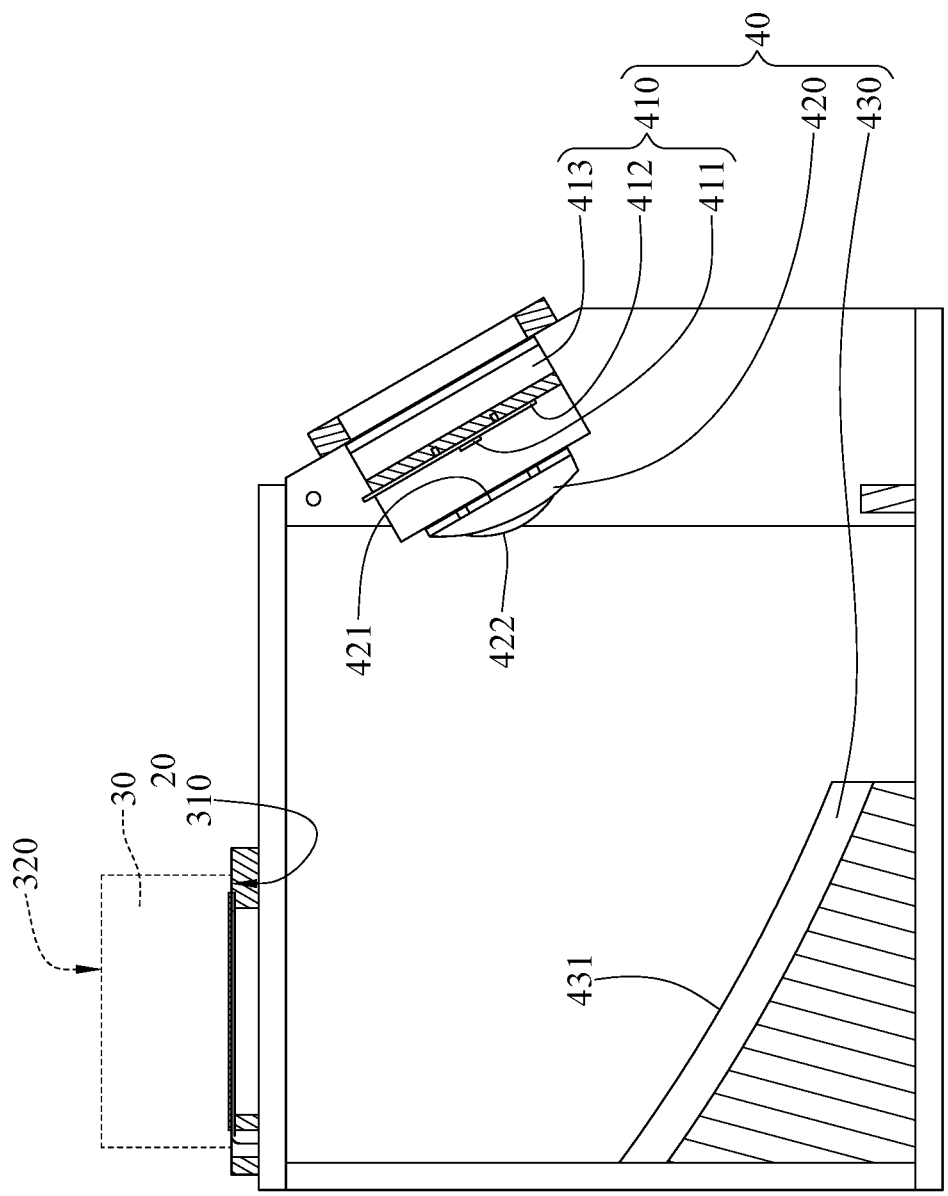
FIG. 2 is a side view of the assembly for 3D printer in FIG. 1.

Please refer to FIG. 1 and FIG. 2. FIG. 1 is a perspective view of an assembly for 3D printer according to one embodiment of the present disclosure, and FIG. 2 is a side view of the assembly for 3D printer in FIG. 1. In this embodiment, an assembly 1, for example but not limited to, is a photo-curing device for 3D printer. The assembly 1 may include a carrier frame 10, a monochrome LCD photomask 20, a container 30 and an illumination module 40. The monochrome LCD photomask 20 and the illumination module 40 may be fixed to the carrier frame 10. The container 30 may be supported on the carrier frame 10 and disposed adjacent to the monochrome LCD photomask 20.

The monochrome LCD photomask 20, for example but not limited to, is a monochrome LCD screen without any sub-pixel. A printed layer can be patterned by controlling the position and size of a light transmission region on the monochrome LCD photomask 20, and one or more printed layers are continuously patterned and stacked in order to form a 3D printed product. The monochrome LCD photomask 20 without sub-pixel can provide high light transmittance, such that the illumination module 40 does not need to have high power, and thus the assembly 1 for 3D printer does not need to be equipped with fins, fans, heat pipes and other cooling elements in large size, which is favorable for miniaturization of a 3D printer.

The container 30 is configured to accommodate aqueous photosensitive material. Specifically, the container 30 may include a supporting bottom portion 310 and an open top portion 320. The aqueous photosensitive material can be poured into the container 30 through the open top portion 320 and supported on the supporting bottom portion 310. A light beam within specific wavelength range may be transmitted through the monochrome LCD photomask 20 having determined pattern and travel into the container 30 to cross-link the aqueous photosensitive material. A platform (not shown in the drawings) may be continuously or intermittently moved downward to touch the photosensitive material, such that the cured photosensitive material can be attached to the platform and continuously stacked layer by layer and eventually a 3D printed product is fabricated on the platform.

The illumination module 40 may include a light emitting unit 410, an optical lens 420 and a concave mirror 430. The monochrome LCD photomask 20 may be disposed to correspond with the concave mirror 430 of the illumination module 40, and a mirror surface 431 of the concave mirror 430 may face toward the monochrome LCD photomask 20. In detail, the monochrome LCD photomask 20 may be disposed between the concave mirror 430 and the container 30, and the monochrome LCD photomask 20 may be located above the concave mirror 430. The concave mirror 430 may be inclined with respect to the monochrome LCD photomask 20.

The light emitting unit 410 may include a light source 411, a circuit board 412 and a heat sink fins 413. The number of the light source 411 may be one or more, and FIG. 2 exemplarily shows that the light source 411 includes single light emitting unit 410. The light source 411 may be disposed at one side of the circuit board 412 and electrically connected with the circuit board 412. The heat sink fins 413 may be disposed at opposite side of the circuit board 412. The light source 411 can emit light within a wavelength range suitable for curing photosensitive material, such as ultraviolet light.

Figure 3:
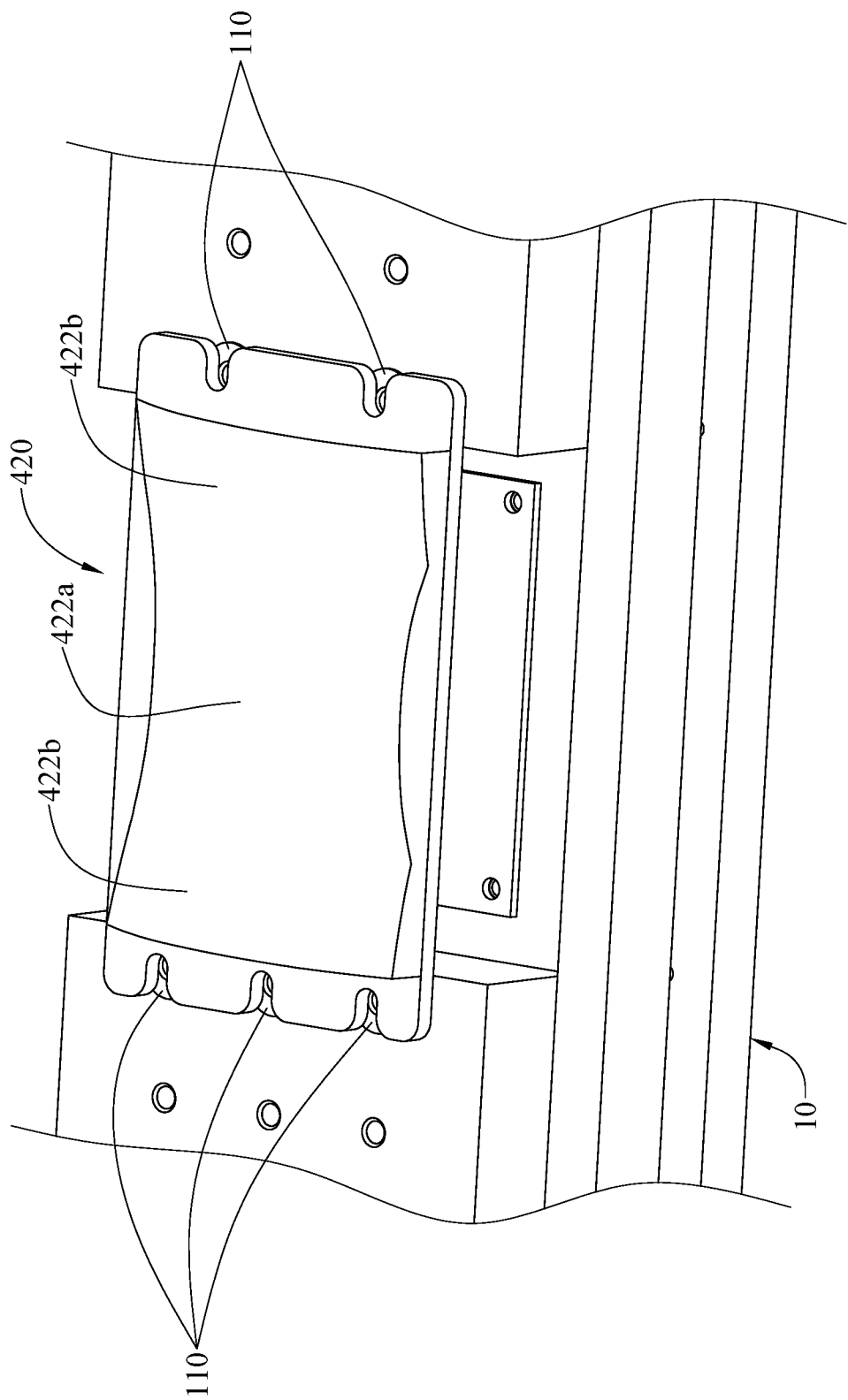
FIG. 3 is a perspective view of an optical lens of the assembly in FIG. 2.
Figure 4:
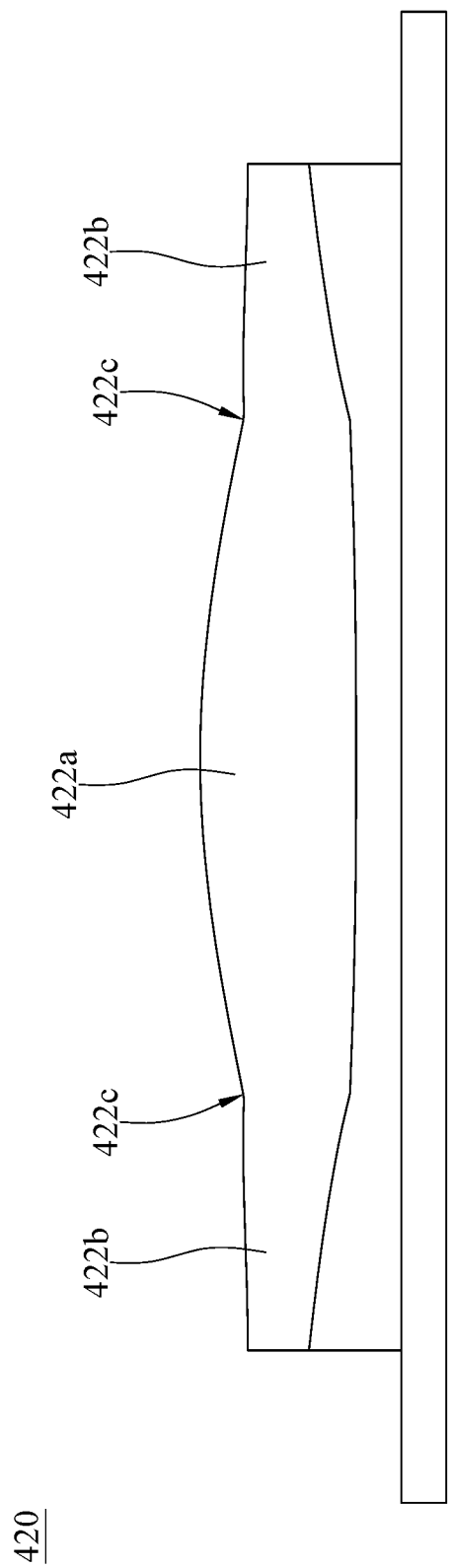
FIG. 4 is a side view of the optical lens in FIG. 3.

The optical lens 420 may be disposed between the light emitting unit 410 and the concave mirror 430; that is, the light emitting unit 410 may be disposed at the object side surface of the optical lens 420. The optical lens 420 with positive refractive has the object-side surface 421 and the image-side surface 422 opposite to each other. Please refer to FIG. 3 and FIG. 4. FIG. 3 is a perspective view of an optical lens of the assembly in FIG. 2, and FIG. 4 is a side view of the optical lens in FIG. 3. The light emitting unit 410 may be disposed adjacent to the object-side surface 421, and the image-side surface 422 may face toward the concave mirror 430. At least one of the object-side surface 421 and the image-side surface 422 may be an asymmetrical surface. FIG. 3 exemplarily shows that the object-side surface 421 is planar in a paraxial region thereof, and the image-side surface 422 is an asymmetrical surface. In some other embodiments, the object-side surface of the optical lens may be concave or convex in a paraxial region thereof. The image-side surface 422 may include a paraxial convex shape 422a and two off-axial curved shapes 422b which are respectively connected with opposite sides of the paraxial convex shape. Moreover, as shown in FIG. 4, there is a concave-to-convex change 422c at a boundary between the paraxial convex shape 422a and respective off-axial curved shape 422b.

Also, as shown in FIG. 3, the carrier frame 10 may include a fool-proof structure 110 corresponding with the optical lens 420 of the illumination module 40. Specifically, the fool-proof structure 110 may include one or more locking holes distributed around the optical lens 420, and a difference of the number and/or positions of the locking holes at left and right sides of the optical lens 420 may be provided.

Figure 5:
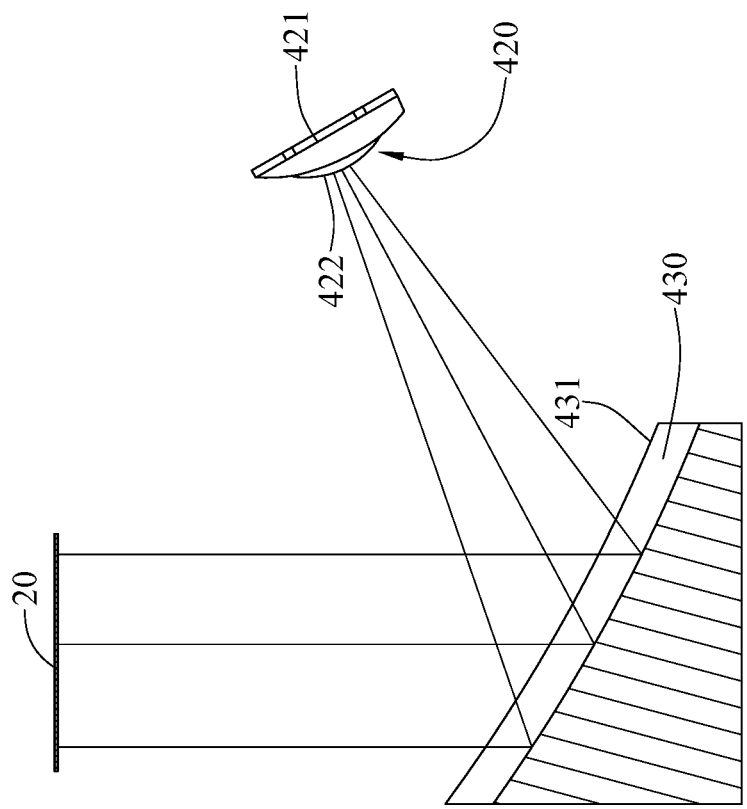
FIG. 5 is a schematic view showing an optical path of the assembly in FIG. 1.

The concave mirror 430 may be disposed at the image side of the optical lens 420 and act as an optical path folding element. FIG. 5 is a schematic view showing an optical path of the assembly in FIG. 1. Light emitted by the light emitting unit 410 may pass through the optical lens 420 and then reflected by the concave mirror 430 to be a parallel light ray traveling to reach the monochrome LCD photomask 20. The parallel light ray is helpful for an even light density distribution across the monochrome LCD photomask 20 as well as a balance of correcting aberrations at the center and the periphery of the monochrome LCD photomask 20 to prevent severe aberrations at the periphery, thereby improving the resolution of 3D printer and the quality of 3D printed product.

In this embodiment, a focal length of the optical lens 420 may be from 10 millimeters (mm) to 20 mm, and a focal length of the concave mirror 430 may be from 60 mm to 100 mm. A numerical aperture of the optical lens 420 may be from 60 mm to 100 mm. A curvature radius of the mirror surface 431 of the concave mirror 430 in a paraxial region thereof is from 300 mm to 450 mm. The paraxial convex shape 422a of the image-side surface 422 of the optical lens 420 may be from 25 mm to 300 mm. An air gap in a paraxial region between a light emitting surface of the light emitting unit 411 and the object-side surface 421 of the optical lens 420 may be from 10 mm to 30 mm, and an air gap in a paraxial region between the image-side surface 422 of the optical lens 420 and the mirror surface 431 of the concave mirror 430 may be from 150 mm to 250 mm.

The optical lens 420 provides an initial design of optical path configuration. In detail, light emitted by the light source 411 of the light emitting unit 410 is converged into a light beam by the optical lens 420, and then the light beam is projected onto the mirror surface 431 of the concave mirror 430.

As to a conventional large-scaled 3D printer (e.g., the monochrome LCD photomask has a significantly larger size than the effective area of the optical lens), in order to cover the full beam range of the monochrome LCD pattern masks, the correction of light rays at off-axis region cannot cause strong convergence of light, such that the off-axial light rays may not become parallel light rays after passing through the optical lens.

In addition, as to a conventional small-scaled 3D printer (e.g., portable/detachable 3D printer or 3D printer desktop), the distance between the optical lens and the light emitting unit is overly short (maybe only a few centimeters) due to size limitation, and a lens with strong refractive power is required for light convergence, while the correction of off-axial light rays by a lens with strong refractive power cannot meet the requirement of high imaging quality. Accordingly, among the above cases, it is difficult to satisfy actual requirements by using only single lens, single lens assembly or single lens array for the correction of light rays Referring to FIG. 2, the assembly 1 for 3D printer according to one embodiment of the present disclosure may include the illumination module 40 in which a concave mirror 430 is provided for a subsequent design of optical path configuration. The concave mirror 430 which acts as an optical path folding element is helpful for compactness of the assembly 1 for 3D printer. Furthermore, as to the light beam passing through the optical lens 420, the subsequent correction of light rays by the concave mirror 430 can cause the off-axial light rays to be parallel light rays, thereby significantly reducing the amount of non-parallel light ray in the light beam incident on the monochrome LCD photomask 20, which is helpful to improve the quality of parallel light.

According to the present disclosure, the concave mirror which acts as an optical path folding element facilitates the miniaturization of 3D printer. As to the light beam passing through the optical lens, the secondary correction provided by the concave mirror can cause the off-axial light rays to be parallel light rays, which is helpful to improve the quality of parallel light.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An illumination module, comprising:
   a light emitting unit;
   an optical lens with positive refractive power, wherein at least one of an object-side surface and an image-side surface of the optical lens is an asymmetrical surface, and the light emitting unit is provided at an object side of the optical lens; and
   a concave mirror provided at an image side of the optical lens, wherein the concave mirror acts as an optical path folding element, and
   light emitted by the light emitting unit passes through the optical lens and is reflected by the concave mirror to be a parallel light ray;
   wherein a focal length of the concave mirror is from 60 mm to 100 mm, and an air gap in a paraxial region between the image-side surface of the optical lens and a mirror surface of the concave mirror is from 150 mm to 250 mm.

2. The illumination module according to claim 1, wherein a focal length of the optical lens is from 10 mm to 20 mm.

3. The illumination module according to claim 1, wherein a numerical aperture of the optical lens is from 60 mm to 100 mm.

4. The illumination module according to claim 1, wherein a curvature radius of a mirror surface of the concave mirror in a paraxial region thereof is from 300 mm to 450 mm.

5. The illumination module according to claim 1, wherein the image-side surface of the optical lens is an asymmetrical surface.

6. The illumination module according to claim 5, wherein the image-side surface of the optical lens comprises a convex shape in a paraxial region thereof.

7. The illumination module according to claim 1, wherein an air gap in a paraxial region between a light emitting surface of the light emitting unit and the object-side surface of the optical lens is from 10 mm to 30 mm.

8. An assembly for 3D printer, comprising:
   the illumination module according to claim 1;
   a monochrome LCD photomask provided to correspond with the concave mirror of the illumination module, and a mirror surface of the concave mirror faces toward the monochrome LCD photomask; and
   a photosensitive material container provided adjacent to the monochrome LCD photomask, and the monochrome LCD photomask is provided between the concave mirror and the photosensitive material container.

9. The assembly for 3D printer according to claim 8, further comprising a carrier frame, wherein the monochrome LCD photomask and the illumination module are fixed to the carrier frame, the monochrome LCD photomask is provided above the concave mirror, and the concave mirror of the illumination module is inclined with respect to the monochrome LCD photomask.

10. The assembly for 3D printer according to claim 8, further comprising a fool-proof structure provided to correspond with the optical lens of the illumination module, the fool-proof structure includes one or more locking holes distributed around the optical lens.

\* \* \* \* \*